United States Patent [19]

Novotny et al.

[11] 4,381,034

[45] Apr. 26, 1983

[54] ZERO FREE WATER CEMENT COMPOSITION AND METHOD

[75] Inventors: Rudolf J. Novotny, Arlington; Richard G. Gandy, Grand Prairie, both of Tex.

[73] Assignee: BJ-Hughes Inc., Houston, Tex.

[21] Appl. No.: 195,460

[22] Filed: Oct. 9, 1980

[51] Int. Cl.³ .............................................. E21B 33/14
[52] U.S. Cl. ..................................... 166/292; 106/89
[58] Field of Search .................. 106/89, 314; 166/292; 405/266

[56] References Cited

U.S. PATENT DOCUMENTS

| | | | |
|---|---|---|---|
| 1,782,471 | 11/1930 | Kirchner et al. | |
| 2,307,741 | 1/1943 | Goldstein | 106/314 |
| 2,492,085 | 12/1949 | Andersen | |
| 2,868,294 | 1/1959 | Beale, Jr. et al. | 166/292 |
| 2,988,424 | 6/1961 | Walsh | 106/89 X |
| 3,313,638 | 4/1967 | Konrad | 106/64 |
| 3,511,314 | 5/1970 | Scott, Jr. et al. | 166/293 |
| 3,833,718 | 9/1974 | Reed et al. | 166/292 X |
| 4,076,546 | 2/1978 | Simeonov et al. | 106/89 |
| 4,125,410 | 11/1978 | Natsuume | 106/314 X |
| 4,235,291 | 11/1980 | Messenger | 166/292 |

OTHER PUBLICATIONS

"R.I.W.", TOXEMENT, Integral Water-Proofing Compound for Portland Cement Construction, Toch Brothers, 1920.

*Primary Examiner*—Stephen J. Novosad
*Assistant Examiner*—George A. Suchfield
*Attorney, Agent, or Firm*—Robert A. Felsman; Charles D. Gunter, Jr.

[57] ABSTRACT

A well cementing composition and method of cementing well bores are disclosed in which a slurry is first prepared utilizing cement, mixing water, and aluminum hydroxychloride in the range of 0.1 to 4.5 weight percent based on the dry weight of cement. The slurry thus prepared when pumped into place in the well bore has zero free water content thereby reducing the bridging or channeling in the cement column which is associated with free water formation.

3 Claims, No Drawings

ZERO FREE WATER CEMENT COMPOSITION AND METHOD

BACKGROUND OF THE INVENTION

This invention relates to cement compositions having zero free water content upon setting and a method for cementing well bores utilizing such compositions.

Cement compositions are used in the oil and gas industry to cement the annular space in well bores between the surrounding formation and pipe or casing. Typically, the cement slurry is pumped down the inside of the casing and back up the outside of the casing through the annular space. When the cement column so formed is allowed to stand, the cement particles, being of greater density, start to settle to the bottom of the slurry. As the particles settle, they tend to collect or "bridge." Just below any area of bridging, a crack is left which contains no cement particles. At the same time, water begins to accumulate at the top of the column. This accumulation of water at the top of the column of cement is known as "free water." Free water is undesirable because the formation of cracks or channels within the cement can lead to failure of the cement column under pressure.

In its specifications for class G and H cements, the American Petroleum Institute (API) Specification 10A, dated April, 1979, sets 1.4 percent by volume as the maximum allowable free water content. Even this amount of free water is detrimental, however. In addition to causing channels or cracks, free water pockets prevent bonding of the cement to the casing and formation and cause density variations in the set column. Free water can cause premature gelling of the cement column, lower the hydrostatic head on a gas zone, and allow gas migration into the column.

Prior art proposals to control excessive free water content call for the addition of certain natural and synthetic materials having a high attraction for water. Thus, the addition of bentonite clay has been proposed to bring the free water content of the composition to within API limits. Other materials proposed in the past include attapulgite clay, sodium metasilicate, diatomaceous earth, sodium silicate, polymers such as hydroxyethyl cellulose and carboxymethyl hydroxyethyl cellulose, and natural and synthetic pozzolans.

Certain of the prior proposals have reduced the free water content of cement compositions to within the API maximum allowable limits. However, even small percentages of free water can cause problems with the ultimate cementing job as has been discussed. Other prior art proposals utilized ingredients which were detrimental to other properties of the cement slurry at ingredient levels necessary to eliminate free water entirely.

SUMMARY OF THE INVENTION

It has now been discovered that the addition of aluminum hydroxychloride to a slurry containing mixing water and a hydraulic cement produces a well bore cement composition having zero free water content when set. A fluid pumpable cement slurry is prepared including hydraulic cement, 30 to 150 weight percent mixing water based on the dry weight of cement, and 0.1 to 4.5 weight percent aluminum hydroxychloride based on the dry weight of cement. The aluminum hydroxychloride can be dry blended with the hydraulic cement and the blend so formed added to the mixing water. The aluminum hydroxychloride can also be supplied as a liquid solution which is added to the mixing water prior to adding the hydraulic cement to form the cement slurry.

In the method of cementing oil well bores, the fluid pumpable slurry thus prepared is then pumped to the desired location in the well bore and allowed to set.

DETAILED DESCRIPTION OF THE INVENTION

The cement composition of the present invention comprises a hydraulic cement, water, and aluminum hydroxychloride. The cement composition is prepared in the form of a fluid pumpable slurry which is then introduced into the oil well through the casing or a pipe.

The hydraulic cement component includes any of the inorganic cements which harden or set under water and may be admixed with extenders, fine aggregate and the like. Thus, for example, any of the class "A-H" and "J" cements as listed in the API Specification 10A, dated April 1979, entitled "Oil Well Cements and Cement Additives," are suitable for this purpose.

The aluminum hydroxychloride component of the present invention is sold commercially by the Reheis Chemical Company in the form of a dry powder. The powder is a glassy solid which dissolves in water to form a slightly turbulent colloided solution. The PH of a 15 percent by weight aqueous solution of the powder is approximately 4.3. The dry powder is the preferred form for this component as the powder can be dry blended with the cement component and stored on the shelf until needed. However, the aluminum hydroxychloride component can also be obtained commercially as a liquid solution. The liquid product is supplied as a 50 percent solution containing approximately 23 to 24 percent by weight $Al_2O_3$ and 7.5 to 8.5 percent by weight Cl, and is prepared by electrolyzing solutions of suitable aluminum salts.

The aluminum hydroxychloride component is utilized in the present cement composition in the range of 0.1 to 4.5 weight percent based on the weight of dry cement, and preferably in the range of 0.5 to 2. weight percent.

Mixing water is utilized with the dry cement component to produce a fluid pumpable slurry of a suitable consistency. API publication RP 10B entitled "Testing Oil Well Cements and Cement Additives," dated December 1979, which is known in the cement industry, in Section 8 thereof describes an approved apparatus and method for measuring the consistency of cement slurries in terms of Bearden Units of Consistency (BC). A pumpable slurry should measure in the range of 2 to 20 BC, and preferably be in the range of 5 to 11 BC. Slurries thinner than 5 BC will tend to have greater particle settling and free water generation. Slurries thicker than about 11 BC become increasingly difficult to pump.

By increasing or decreasing the quantity of mixing water, the consistency of the cement slurry containing the aluminum hydroxychloride component can be brought within acceptable limits. In addition, as will be described later in greater detail, slurry consistency can be brought within acceptable limits by the addition of known additives such as bentonite gel, sodium chloride, lignosulfonates, naphthalene sulfonic acid salts, silica sand, sodium metasilicate, fly ash, and pozzolans.

Depending on the particular slurry and intended conditions of use, mixing water is utilized in the slurry of the present invention in the range of 30 to 150 weight percent based on the weight of dry cement and preferably in the range of 35 to 90 weight percent.

To better illustrate the invention, class "G" and "H" oil well cements were used to make up sample slurries using a Waring blender as the mixer. Aluminum hydroxychloride in the dry powder form was first added to the dry cement and thoroughly blended. The mixing water was placed in the blender jar and the cement containing aluminum hydroxychloride was added, in 15 seconds or less, to the water while stirring at low speed. When all the dry cement blend had been added, the stirring was increased to high speed for 35 seconds.

The mixture was then placed in atmospheric consistometer and stirred for 20 minutes. The mixture was then restirred for 35 seconds at high speed on the Waring blender and 250 mls. were poured into a 250 ml. graduated cylinder. The cylinder was sealed with a piece of sheet plastic and allowed to stand for two hours, after two hours, the amount of free water collected at the top of the cement slurry in the cylinder was measured. The amount of free water was expressed as volume percent of the 250 mls. of slurry. This procedure is the API Free Water Content procedure as it appears on page 7 of API RP 10B. Results of these tests appear in Table I. The following abbreviations are used in Table I:

| Abbreviation | Meaning |
|---|---|
| AHC | aluminum hydroxychloride |
| NSA | naphthalene sulfonic acid salt |
| ASM | anhydrous sodium metasilicate |
| SF | silica flour |
| SLF | sodium lignosulfonate |
| NaCl | sodium chloride |

One sack of cement in Table I contains approximately 94 lbs. of cement. The weight percentages are based on the weight of dry cement.

TABLE I

| Test | Cement Class | Mix | Water Wt. % | AHC Wt. % | NSA Wt. % | ASM Wt. % | SF Wt. % | SLF Wt. % | NaCl Wt. % | Consistency BC 0' | Consistency BC 20' | Free Water Volume % |
|---|---|---|---|---|---|---|---|---|---|---|---|---|
| 1 | H | 1:0:0 | 38.0 | 0 | 0 | | | | | 6 | 8 | 0.12 |
| 2 | H | 1:0:0 | 38.0 | 1.1 | 0 | | | | | 10 | 19 | 0 |
| 3 | H | 1:0:0 | 38.0 | 1.1 | 1.0 | | | | | 9 | 13 | 0 |
| 4 | H | 1:0:0 | 105 | 0 | | 2.0 | | | | 5 | 3 | 0.88 |
| 5 | H | 1:0:0 | 105 | 1.1 | | 2.0 | | | | 4 | 5 | 0 |
| 6 | H | 1:0:0 | 105 | 1.1 | 1.0 | 2.0 | | | | 4 | 5 | 0 |
| 7 | G | 1:0:0 | 44.0 | 0 | 0 | | | | | 6 | 10 | 1.36 |
| 8 | G | 1:0:0 | 44.0 | 1.1 | 0 | | | | | 16 | 22 | 0 |
| 9 | G | 1:0:0 | 44.0 | 1.1 | 1.0 | | | | | 8 | 10 | 0 |
| 10 | H | 1:0:0 | 50.26 | 0 | | | 35 | | | 9 | 11 | 0.48 |
| 11 | H | 1:0:0 | 50.26 | 1.0 | | | 35 | | | 17 | 25 | 0 |
| 12 | H | 1:0:0 | 38.0 | 0 | | | | 0.7 | | 3 | 7 | 0.44 |
| 13 | H | 1:0:0 | 38.0 | 0.84 | | | | 0.7 | | 11 | 17 | 0 |
| 14 | H | 1:0:0 | 38.0 | 0 | | | | | 37.2 | 6 | 5 | 0.72 |
| 15 | H | 1:0:0 | 38.0 | 2.0 | | | | | 37.2 | 14 | 11 | 0 |

Tests 1–3 show that a cement composition can be obtained having zero free water content by the addition of aluminum hydroxychloride in select percentages. The aluminum hydroxychloride is also compatible with naphthalene sulfonic acid salt which additive can be dry blended with the cement prior to addition to the mixing water as in test 3. The resulting slurry has a desirable consistency and zero free water content.

In tests 4–6, anhydrous sodium metasilicate is dry blended with the cement prior to addition to the mixing water. The addition of aluminum hydroxychloride eliminates free water entirely.

Tests 7–9 are similar to tests 1–3, except that class "G" oil well cement is utilized. Tests 10–15 show that aluminum hydroxychloride is compatible with cement systems utilizing other known cement additives to give a slurry having zero free water content upon setting.

In Table II which follows, the same procedures were followed. The mix in this case includes 8% bentonite gel based on the dry weight of cement.

TABLE II

| Test | Cement Class | Mix | Water Wt. % | AHC Wt. % | NSA Wt. % | Consistency BC 0' | Consistency BC 20' | Free Water Volume % |
|---|---|---|---|---|---|---|---|---|
| 16 | H | 1:0:8 | 88.4 | 0 | 0 | 10 | 11 | .052 |
| 17 | H | 1:0:8 | 88.4 | 1.1 | 0 | 12 | 13 | 0 |
| 18 | H | 1:0:8 | 88.4 | 1.1 | 1.1 | 2 | 5 | 0 |

In Table III which follows, a fly ash cement mix including bentonite gel was employed. One sack of fly ash weighs approximately 74 lbs. Thus, in test 19, the total weight of the mix including gel was 50% (74 lbs.) + 50% (94 lbs.) + 2% (84 lbs.) = 85.68 lbs.

TABLE III

| Test | Cement Class | Mix | Water Wt. % | AHC Wt. % | NSA Wt. % | Consistency BC 0' | Consistency BC 20' | Free Water Volume % |
|---|---|---|---|---|---|---|---|---|
| 19 | H | 50:50:2 | 54.0 | 0 | 0 | 7 | 9 | 0.76 |
| 20 | H | 50:50:2 | 54.0 | 1.5 | 0 | 20 | 24 | 0 |
| 21 | H | 50:50:2 | 54.0 | 1.0 | 1.0 | 7 | 9 | 0 |
| 22 | H | 35:65:6 | 76.0 | 0 | 0 | 14 | 12 | 0.72 |

TABLE III-continued

| Test | Cement Class | Mix | Water Wt. % | AHC Wt. % | NSA Wt. % | Consistency BC 0' | Consistency BC 20' | Free Water Volume % |
|---|---|---|---|---|---|---|---|---|
| 23 | H | 35:65:6 | 76.0 | 1.1 | 0 | 10 | 13 | 0 |
| 24 | H | 35:65:6 | 76.0 | 1.1 | 1.0 | 3 | 7 | 0.04 |

In Table IV, the mix contained one sack of a pozzolan sold commercially by BJ-HUGHES, Inc. as "DIAMIX A".

TABLE IV

| Test | Cement Class | Mix | Water Wt. % | AHC Wt. % | NSA Wt. % | Consistency BC 0' | Consistency BC 20' | Free Water Volume % |
|---|---|---|---|---|---|---|---|---|
| 25 | G | 1:1:0A | 101.3 | 0 | 0 | 4 | 6 | 1.2 |
| 26 | G | 1:1:0A | 101.3 | 1.5 | 0 | 8 | 12 | 0 |
| 27 | G | 1:1:0A | 101.3 | 1.4 | 1.0 | 7 | 10 | 0 |

In cementing a well pipe or casing using the present invention, a slurry is prepared containing at least cement, mixing water, and aluminum hydroxychloride in the range of 0.1 to 4.5 weight percent based on the dry weight of cement.

Other additives can be present in the cement or added to the slurry as has been shown such as retarding or accelerating agents, thickening or thinning agents, lost circulation materials, and the like. The slurry is then introduced into the annulus between the well pipe or casing and the surrounding formation and allowed to set, thereby bonding the pipe or casing to the bore of the well. The slurry may be introduced into the annulus in any described way, as by pumping the slurry down the pipe and allowing it to flow upward into the annulus, or by forcing it into the annulus through perforations in the pipe.

While the invention has been shown in only one of its forms, it should be apparent to those skilled in the art that it is not thus limited but is susceptible to various changes and modifications without departing from the spirit thereof.

We claim:

1. A method of cementing well bores, comprising the steps of:
   preparing a fluid, pumpable cement slurry, said slurry comprising hydraulic cement, mixing water in the range of 30 to 150 weight percent based on the dry weight of cement, and aluminum hydroxychloride in the range of 0.1 to 4.5 weight percent based on the dry weight of cement;
   pumping said slurry to the desired location in the well bore; and
   allowing said slurry to set.

2. The method of claim 1, wherein said aluminum hydroxychloride in the powder form is dry blended with said hydraulic cement to form a blend thereof and said blend is then added to the mixing water.

3. The method of claim 1, wherein said aluminum hydroxychloride is provided as a liquid solution and said solution is added to the mixing water prior to adding said dry hydraulic cement.

* * * * *